March 30, 1943.  R. W. PALMER  2,314,949
AIRPLANE
Filed July 12, 1940  6 Sheets-Sheet 1
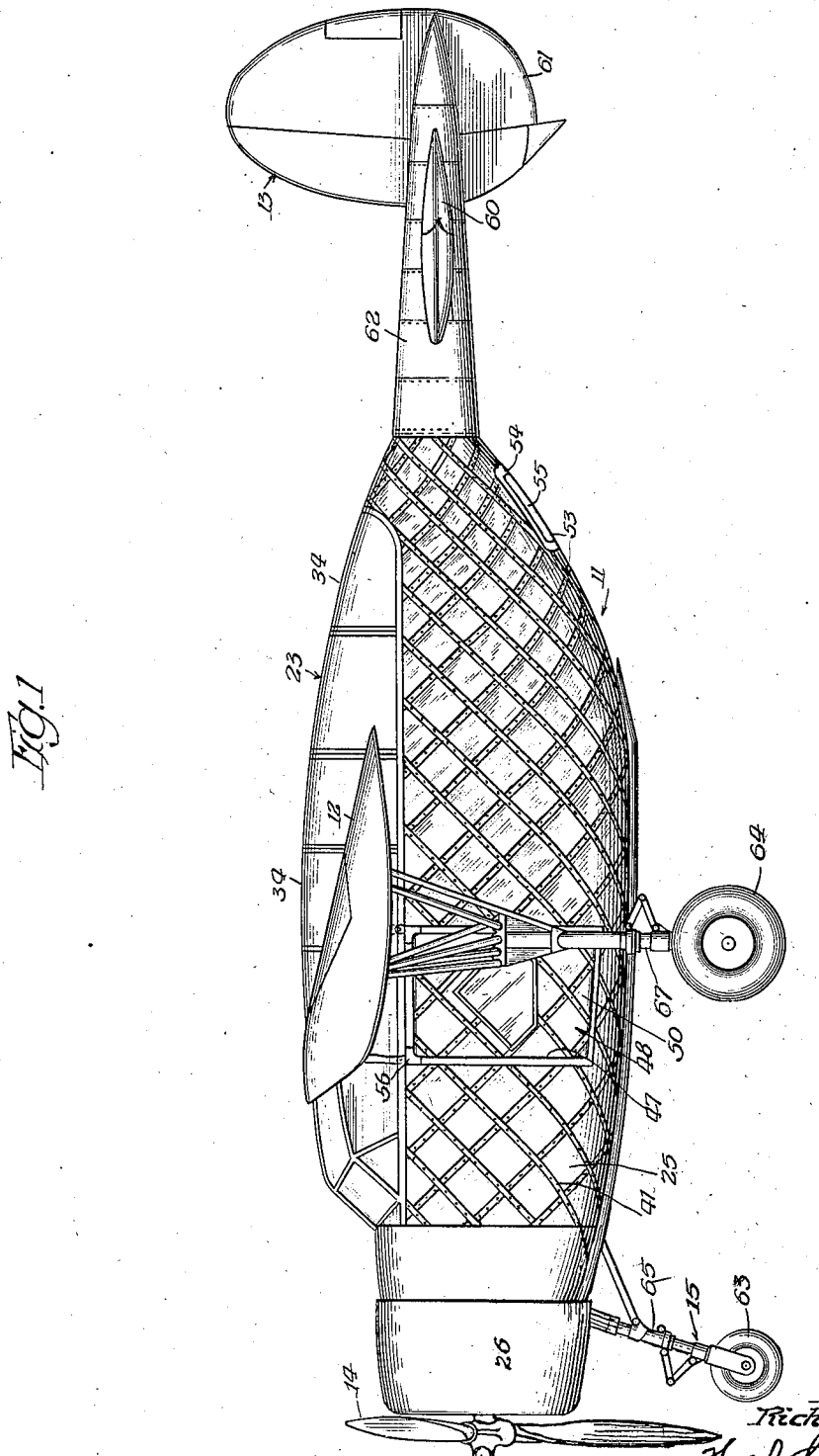

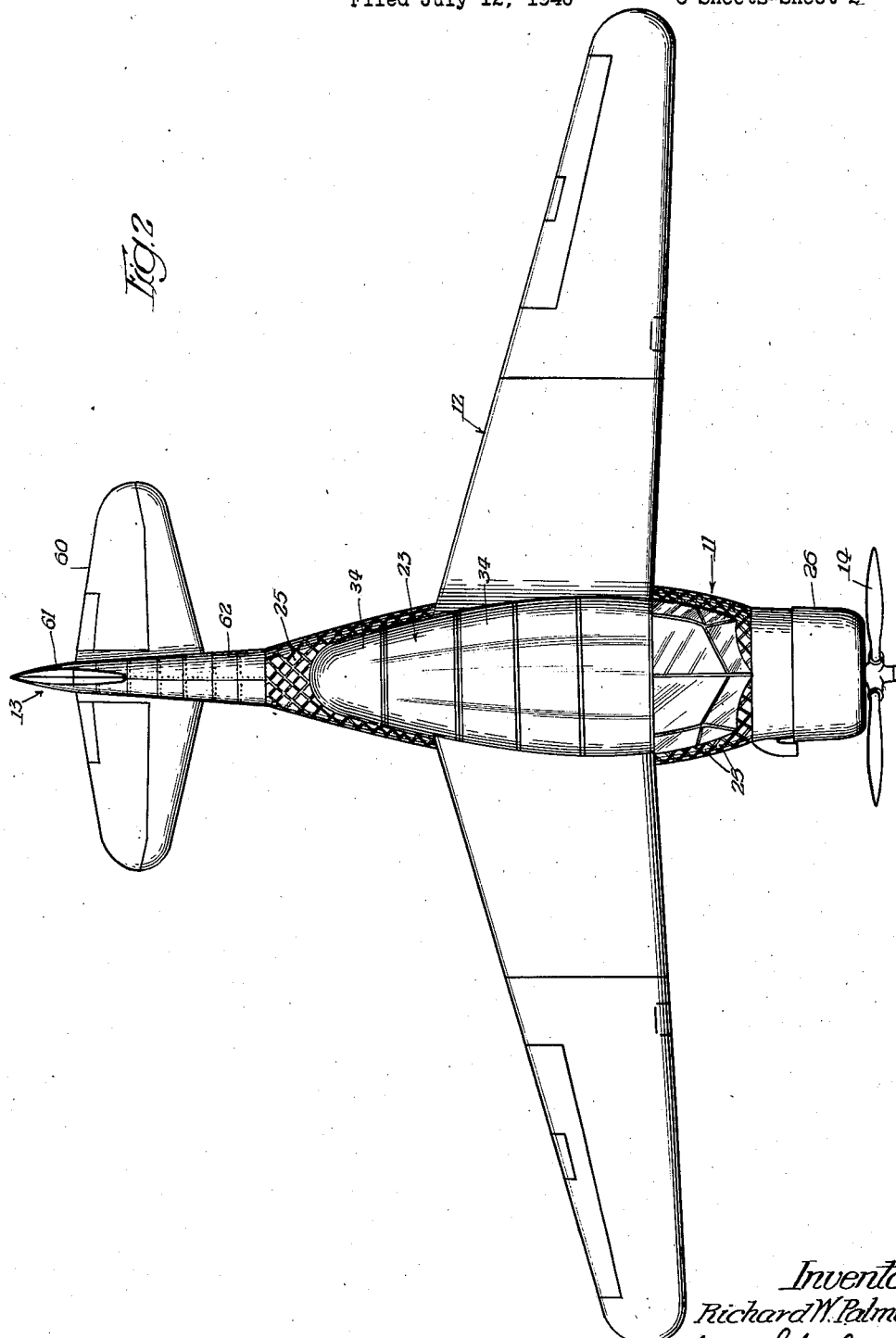

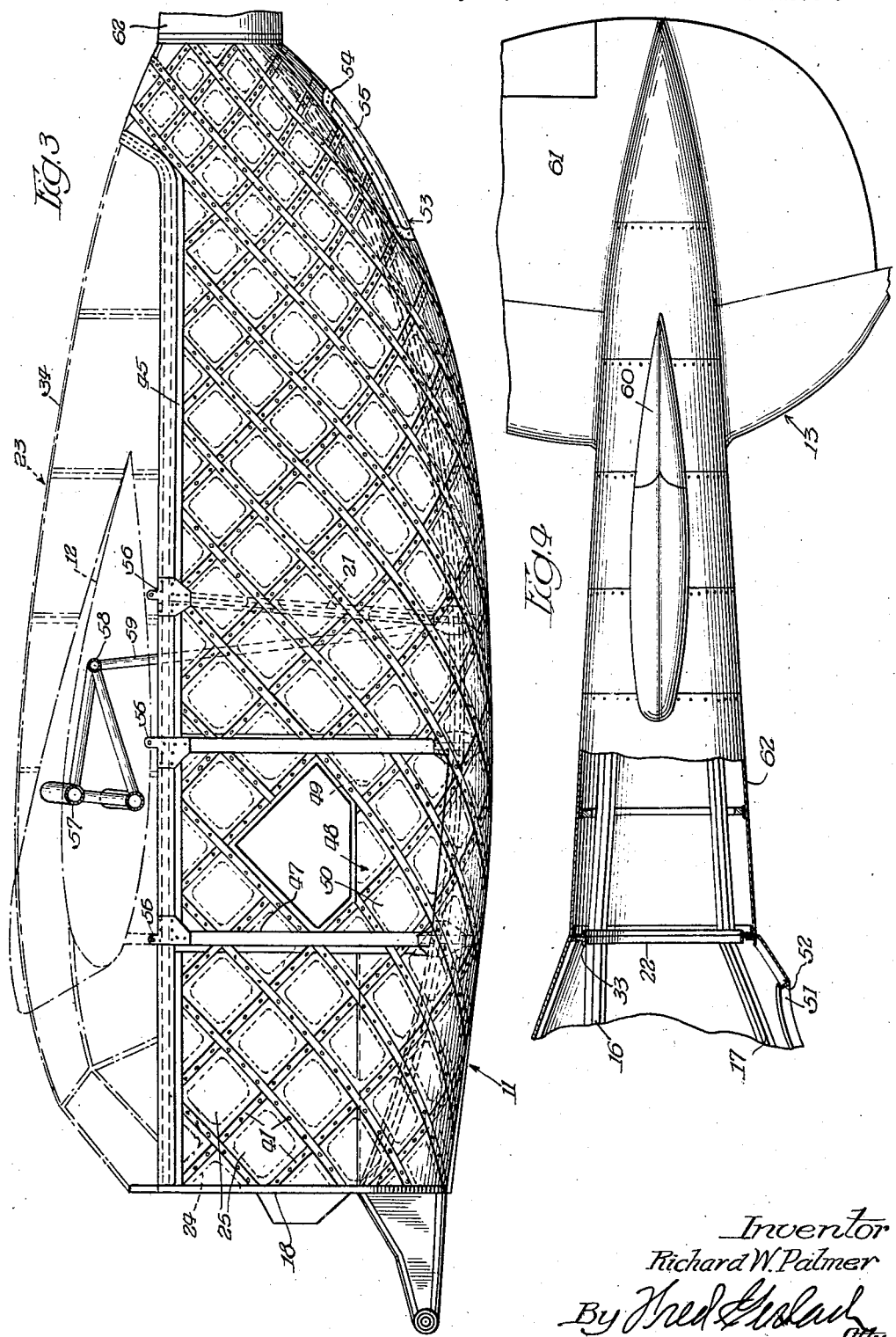

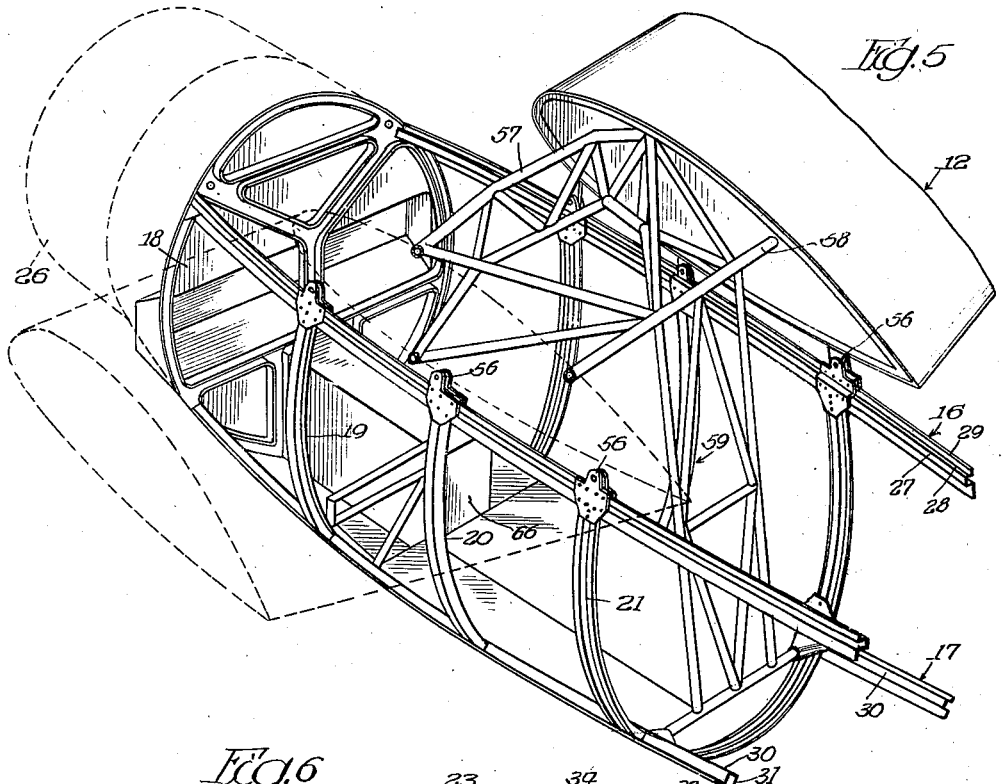
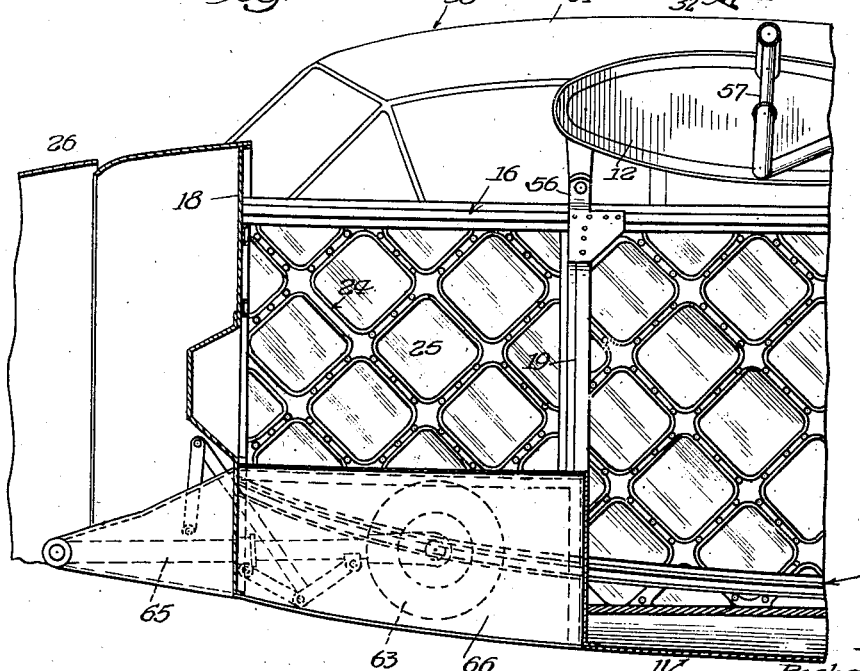

March 30, 1943.   R. W. PALMER   2,314,949
AIRPLANE
Filed July 12, 1940   6 Sheets-Sheet 5

Inventor
Richard W. Palmer

March 30, 1943.  R. W. PALMER  2,314,949
AIRPLANE
Filed July 12, 1940  6 Sheets-Sheet 6
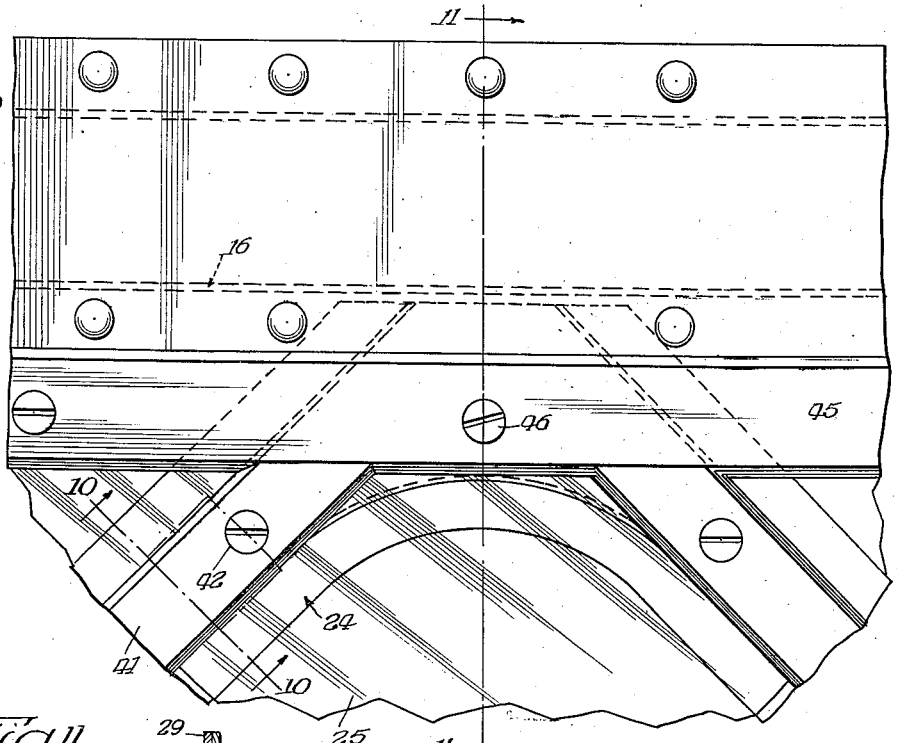
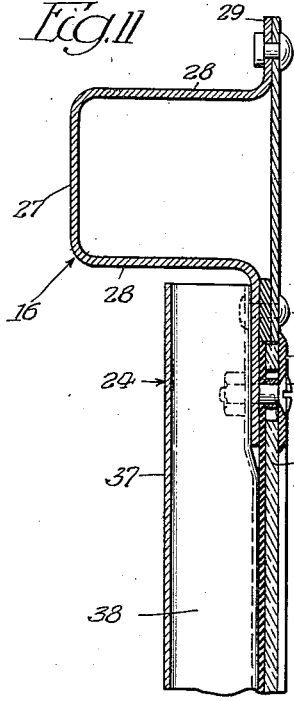
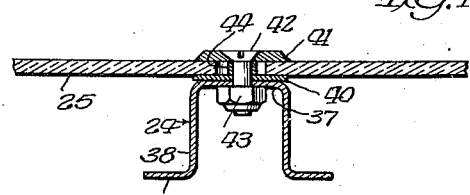
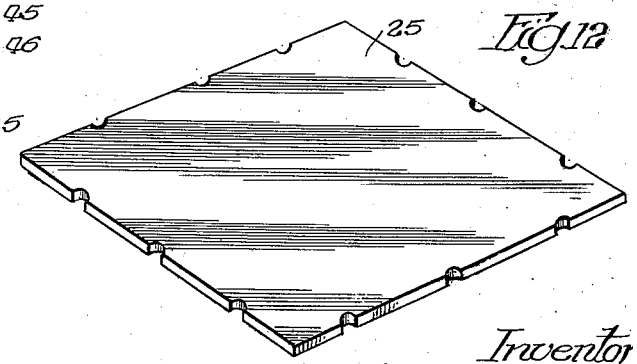
Inventor
Richard W. Palmer
By Fred Gerlach
Atty Patented Mar. 30, 1943

2,314,949

UNITED STATES PATENT OFFICE 2,314,949

AIRPLANE

Richard W. Palmer, Whittier, Calif., assignor to Vultee Aircraft, Inc., Downey, Calif., a corporation of Delaware Application July 12, 1940, Serial No. 345,107

10 Claims. (Cl. 244—119)

The present invention relates generally to airplanes. More particularly the invention relates to that type of airplane which is primarily designed for use in observation or photographic work and comprises a fuselage together with wings, empennage, propelling mechanism and landing gear.

One object of the invention is to provide an airplane of this type which is generally an improvement upon and has certain inherent advantages over previously designed observation airplanes and is characterized by the fact that the fuselage is so designed and constructed that the pilot and observer have unobstructed vision through substantially all parts or portions of it.

Another object of the invention is to provide an observation airplane of the type under consideration in which the fuselage comprises the usual longérons, cross members and internal reinforcing members and embodies as a shell a framework of geodetic or latticed design together with flexible transparent plates across the spaces between the diagonally extending members of the framework.

A further object of the invention is to provide an observation airplane of the aforementioned type in which the fuselage is substantially ellipsoidal in contour or shape and embodies at the rear end thereof a narrow tailboom for supporting the empennage.

A still further object of the invention is to provide an airplane of the last mentioned character or type in which the fuselage is substantially elliptical in cross section and is of greatest thickness from top to bottom, and the empennage supporting tailboom is fixed to the rear end of the fuselage at a point above the longitudinal center line of the fuselage with the result that the observer in the rear of the fuselage is able to see clearly under the empennage and may look rearwards, as well as rearwards and downwards without any appreciable obstruction.

Other objects of the invention and the various advantages and characteristics of the present airplane will be apparent from a consideration of the following detailed description.

The invention consists in the several novel features which are hereinafter set forth and are more particularly defined by claims at the conclusion hereof.

In the drawings which accompany and form a part of this specification or disclosure and in which like numerals of reference denote corresponding parts throughout the several views:

Figure 1 is a side view showing an observation airplane embodying the invention with the landing gear thereof in its extended or operative position and illustrating the shape and design of the fuselage and empennage supporting tailboom;

Figure 2 is a plan view of the airplane;

Figure 3 is an enlarged side view of the fuselage illustrating in detail the design and construction of the shell;

Figure 4 is a side view of the tailboom, parts being broken away and other parts being shown in section in order to illustrate the manner in which the front end of the tailboom is connected to the rear end of the substantially ellipsoidal fuselage;

Figure 5 is a fragmentary perspective of the front end of the fuselage, the geodetic or latticed framework and the flexible transparent plates constituting the shell being omitted;

Figure 6 is an enlarged vertical longitudinal sectional view of the front end of the fuselage;

Figure 9 is an enlarged fragmentary detail or side view of the portion of the fuselage shell that is adjacent one of the upper longérons of the fuselage;

Figure 10 is a section taken on the line 10—10 of Figure 9 and showing in detail the manner in which the margins of the transparent plates are so connected to the cross members of the geodetic or latticed framework that the plates are free to expand or contract without buckling or causing distortion of the framework;

Figure 11 is a section on the line 11—11 of Figure 9; and

Figure 12 is a perspective of one of the transparent plates of the fuselage shell.

Figure 7:
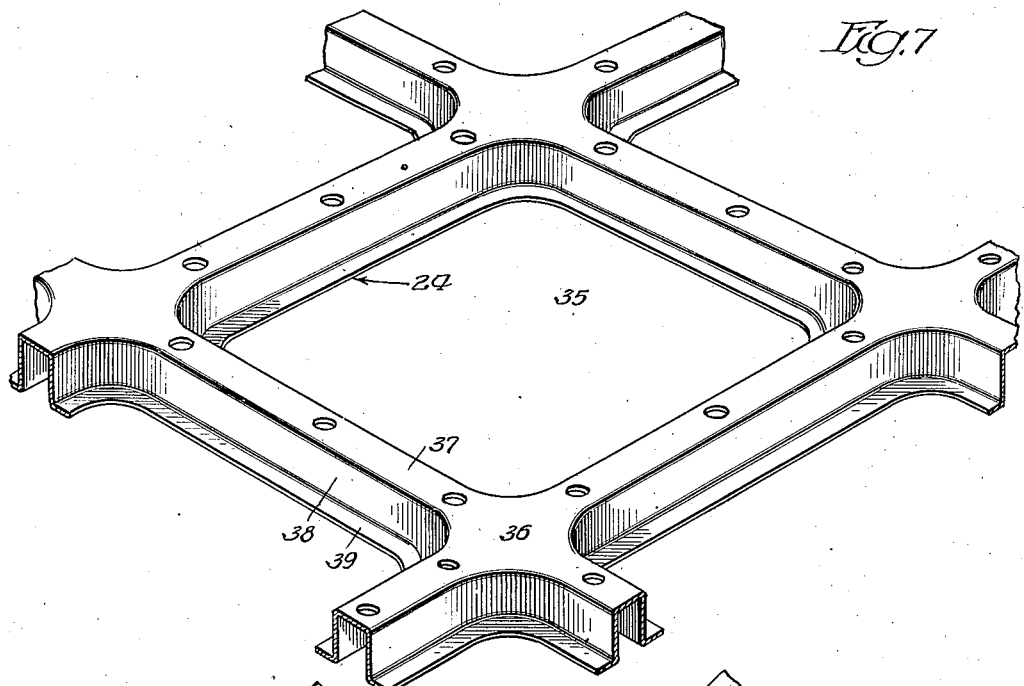
Figure 7 is a fragmentary perspective of part of the geodetic or latticed framework.

The airplane which is shown in the drawings constitutes the preferred embodiment of the invention. It is primarily designed for observation or photographic work and as its main or principal parts comprises a fuselage 11, a pair of wings 12, an empennage 13, a propeller 14 and a retractable tricycle landing gear 15.

Figure 8:
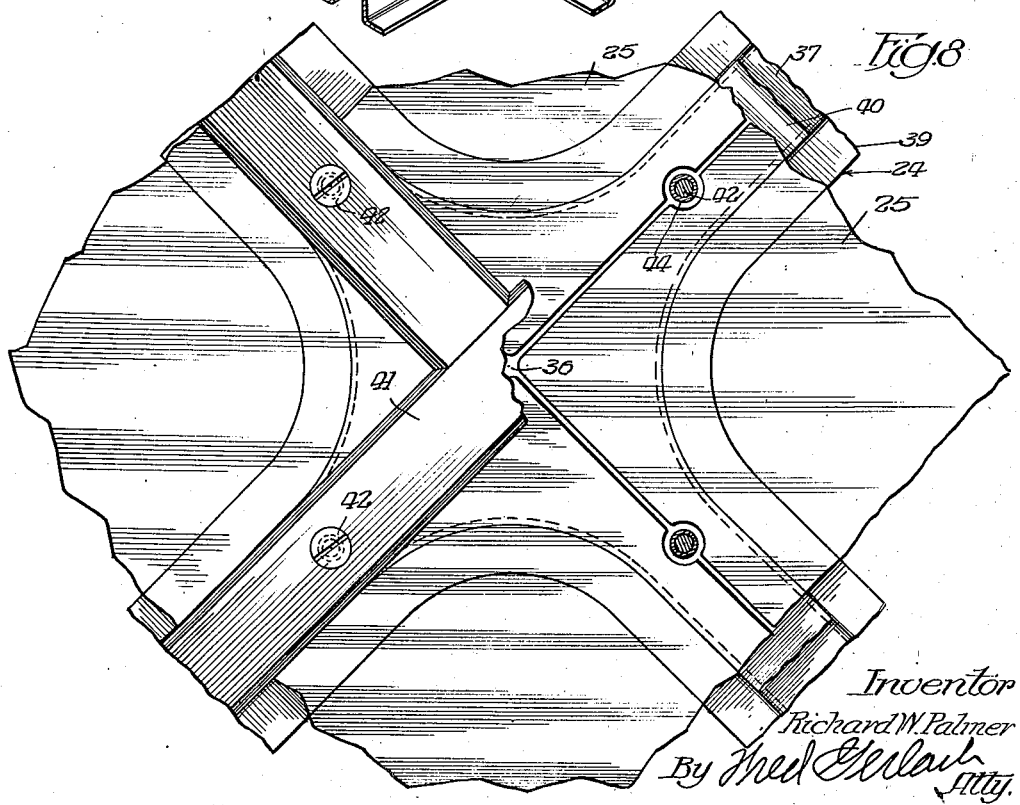
Figure 8 is a fragmentary side view of part of the fuselage shell, parts of the plate retaining strips being broken away for purposes of illustration.

The fuselage 11 serves to house the pilot and observer of the airplane. It houses the usual control mechanism and operating equipment and carries at the front end thereof an internal combustion engine (not shown) for driving the propeller 14. As illustrated, the airplane is of the high wing monoplane type. The fuselage 11 is substantially ellipsoidal in contour (see Figures 1 and 2) and as far as cross section is concerned it corresponds to an ellipse with a vertical major axis. It carries the wings 12 at the sides thereof and comprises a pair of horizontally extending laterally spaced full length upper longerons 16, a pair of downwardly bowed laterally spaced full length lower longerons 17, a front bulkhead 18, a pair of laterally spaced front ribs 19, a pair of laterally spaced intermediate ribs 20, a pair of laterally spaced rear ribs 21, a rear end ring 22, a top enclosure 23 and in addition a shell consisting of a geodetic or latticed framework 24 and plates 25. The bulkhead 18 is located at, and extends across, the front end of the fuselage and serves as a firewall between the propeller driving engine and the front portion of the fuselage interior. It extends transversely of the fuselage and is positioned directly behind the engine. The engine is suitably secured to the bulkhead 18 and is surrounded by a ring-shaped housing 26. The upper longerons 16 lead or extend rearwards from the upper side portions of the bulkhead 18 and support the enclosure 23. They overlie the lower longerons 17 and are channel shaped in cross section. As shown in Figure 5, the upper longerons 16 comprise crosswebs 27, side legs 28 and out-turned flanges 29 and are arranged so that the side legs 28 project or face outwards, i. e., in the direction of the fuselage exterior. The out-turned flanges 29 are formed integrally with, and project at right angles to, the outer margins of the side legs 28, as shown in Figure 5. The front, intermediate and rear ribs of the fuselage extend substantially vertically and are located in the central portion of the fuselage, as shown in Figure 3. They are spaced apart and have the upper ends thereof fixedly secured to the upper longerons 16. The lower ends of the ribs are fixedly connected in any suitable manner to the central portions of the lower longerons 17. As shown in Figure 3, the ribs are of channel formation and are shaped and designed like the upper longerons 16. The lower longerons project or extend rearwards from the lower side portions of the bulkhead 18 and are the same in cross section as the upper longerons and the ribs 19, 20 and 21. They are channel shaped and comprise crosswebs 30, and outwardly extending side legs 31, and in addition out-turned flanges 32 along the outer margins of the side legs 31. The rear ends of the lower longerons are upwardly and rearwardly curved in a comparatively sharp manner. The rear end ring 22 defines the rear end of the fuselage and is fixedly secured to the rear ends of the upper and lower longerons 16 and 17. It is located at an appreciable distance above the longitudinal center of the fuselage and embodies an outwardly extending annular flange 33. The top enclosure 23 completes and serves to close the top of the fuselage and rests upon and is secured to the upper longerons 16. It corresponds in cross section to the lower portion of the fuselage and is formed of a longitudinal series of curved panels 34. The latter are formed of "Plexiglass" or other like flexible transparent material and permit the pilot and observer of the airplane to see above the fuselage without any appreciable obstruction. Certain of the panels 34 are in the form of movably mounted hatches in order that the pilot and observer may open the top of the fuselage when desired. The shell consisting of the framework 24 and the plates 25, extends around and serves as a closure for the sides and bottom of the fuselage. It gives the sides and bottom of the fuselage the desired shape and affords the pilot and observer substantially complete of unobstructed vision through the sides, bottom and rear of the fuselage. The framework 24 is formed of a plurality of serially arranged and connected metallic stampings and comprises a set of laterally spaced substantially parallel members which extend diagonally in one direction and a second set or group of laterally spaced substantially parallel members which extend diagonally in the opposite direction. The members of one set extend at substantially right angles to the other set or group and define with the last mentioned members substantially square openings or spaces 35. As shown in Figure 8, the stampings of which the framework 24 of the shell is formed are of one-piece design and include cross-shaped parts 36 at the points where the diagonally extending members of one set or group intersect and join the members of the other set or group. Each of the diagonally extending members is of channel cross section and consists of a crossweb 37, a pair of laterally spaced parallel side legs 38 and a pair of out-turned flanges 39. The side legs 38 of the diagonally extending frame work members extend inwardly from the side margins of the crosswebs 37 and are joined to, and formed integrally with, the side margins of the webs. The flanges 39 are joined to, and formed integrally with, the inner margins of the side legs 38 and are positioned in parallel relation with the crosswebs 37. The stampings of which the framework is formed are curved or of concavo-convex character, as shown in the drawings. Preferably the stampings have butt joints between them and are suitably maintained in rigid or serially connected relation. The lower longerons 17 of the fuselage are disposed inwardly of the framework 24 and are fixedly secured to the latter by riveting or otherwise securing the out-turned flanges 32 thereof to the out-turned flanges 39 at the points where such flanges cross or lap one another. The plates 25 of the fuselage shell are square and serve to cover or close the spaces 35 which are defined by the diagonally extending members of the framework 24. They are formed of "Plexiglass" or like flexible transparent material and permit the pilot and observer of the airplane to see outwards through the spaces 35. The margins of the plates 25 are arranged in lapped relation with the outer faces of the crosswebs 37, as shown in Figure 9. Each of the plates is of such size that the four edges thereof are in spaced relation with the opposed edges of the adjacent plates. As a result of this arrangement the plates are free to expand or contract and hence they do not buckle or warp. Furthermore they do not impose any strain or distorting forces on the frame 24. Gasket strips 40 of synthetic rubber or other elastic or resilient material are interposed between the margins of the "Plexiglass" plates 25 and the outer faces of the crosswebs 37 and serve as resilient backings for the plates. The plates are secured in place by means of metallic attaching strips 41 and bolts 42. The attaching strips have beveled side margins and overlie the top faces of the marginal portions of the plates, as shown in Figure 9. The bolts 42 extend through aligned holes in the gasket strips 40 and the crosswebs 37 and have nuts 43 at their inner ends. Bushings 44 surround the shanks of the bolts 42 and serve so to space the heads of the bolts from the crosswebs 37 that the margins of the plates are not under such clamping pressure that they cannot freely expand or contract. The margins of the plates 25 have semi-circular notches therein for accommodating the bushings 44 and these notches, as shown in Figure 8, are of greater diameter than the bushings with the result that the bushings do not interfere with the expansion and contraction of the transparent plates. The nuts 43 on the inner ends of the shanks of the bolts bear against the inner faces of the crosswebs 37. The attaching strips 41 together with the bolts 42 and the bushings 44 serve to hold the plates 25 in connected relation with the framework 24 but permit the plates to expand or contract. The plates are curved conformably to the diagonally extending members of the framework 24 and serve as windows for the pilot and observer or other members of the crew of the airplane. The cross-shaped parts 36 at the upper side portions of the framework 24 are fixed to the lowermost flanges 29 of the upper longérons 16. The plates 25 at the upper side portions of the framework are triangular and have the upper margins thereof secured against the lowermost flanges 29 of the upper longérons 16 by attaching strips 45 and bolts 46, as shown in Figure 10. The front end of the framework 24 is suitably secured to the side and lower portions of the bulkhead 18 and the rear end of the framework is secured to the rear end ring 22 of the fuselage. The space between the ribs 19 and 20 at one side of the fuselage serves as, or constitutes, a doorway 47. This doorway is normally closed by a door 48 which is hinged at the upper portion thereof and consists of a geodetic or latticed type framework 49 and "Plexiglass" plates 50. The framework 49 corresponds to the framework 24 and the plates 50 are like the plates 25 and are secured in place in the same manner as said plates 25. By having the door 48 in the form of a geodetic or latticed framework 49 and flexible transparent plates 50 the door does not prevent the pilot or observer from seeing through the doorway 47. An opening 51 is formed in the lower rear portion of the fuselage. This opening is adapted to accommodate a machine gun or camera and is defined by a stamped metal frame 52. The latter fits within and is secured to the lower rear portion of the framework 24 of the fuselage shell and has a door 53 associated with it. The door serves normally to close the opening 51 and consists of a frame 54 and a panel 55 of "Plexiglass" or other transparent material. Because the fuselage is ellipsoidal in shape or contour and is formed for the most part of plates or panels of "Plexiglass" or like material the pilot and observer of the airplane have substantially complete or unobstructed visibility and can see through the sides, bottom and top of the fuselage as well as through the fuselage rear end. Due to the fact that the framework 24 of the fuselage shell is of geodetic or latticed design the fuselage is sufficiently rigid or reinforced to fulfill its intended purpose.

The wings 12 are substantially coplanar and project outwards from the sides of the transparent top closure 23 of the fuselage. They are of standard or conventional design and embody forwardly disposed main beams (not shown) and rearwardly disposed secondary beams (also not shown). The inner portions of the two wings are connected to the upper ends of the ribs 19, 20 and 21 by means of bracket devices 56. The inner ends of the main beams of the wings are cross connected by an upwardly bowed crosspiece 57 of truss formation. This crosspiece extends through the central portion of the top enclosure 23. The inner ends of the secondary beams of the wings 12 are cross connected by a crosspiece 58 which is connected to the upwardly bowed crosspiece 57 and also to certain of the ribs by truss type reinforcing members 59.

The empennage 13 comprises a pair of elevators 60 and a rudder 61 and is mounted on the rear end of a narrow tailboom 62. The latter tapers from the front end of its rear end and is of circular cross section. The front end of the tailboom corresponds in diameter, and is riveted or otherwise fixedly secured, to the inwardly extending annular flange 32 on the rear end ring 22. The boom is hollow and has a metallic skin covering therearound. By reason of the fact that the rear end ring 22 is above the longitudinal center of the fuselage the tailboom and empennage are so disposed that the observer has full rearward vision from the fuselage. Because the tailboom is narrow and the fuselage is ellipsoidal in shape or contour and substantially transparent the observer of the airplane may see rearwards about or along all portions of the boom. Preferably the rear end ring 22 is positioned so that the bottom portion thereof is substantially aligned with the longitudinal center line of the fuselage. By so disposing the tailboom and having the rear lower portion of the fuselage curved sharply the observer has full or clear downward and rear vision from the rear end of the fuselage.

The landing gear 15 comprises a front wheel 63 and a pair of rearwardly disposed side wheels 64. The front wheel is mounted on the distal end of a pivoted strut 65 and is adapted when not in use to be swung upwards into a well 66 in the front lower portion of the fuselage 11. The side wheels 64 underlie the wings 12 and are mounted on the distal ends of a pair of pivoted struts 67. They are adapted when not in use to be swung upwards into pockets or wells (not shown) in the under portions of the wings. The front and side wheels are so carried by their respective struts that when they are in operative or ground engaging position they maintain the fuselage in parallel relation with the subjacent ground. By employing a tricycle type landing gear and having the empennage 13 supported by the narrow tailboom 62 there is no likelihood of the empennage coming in contact with the ground during take-off of the airplane. Furthermore the observer has full rearward vision through the lower rear portion of the fuselage shell.

The herein described airplane is extremely efficient when used for observation or photographic purposes due to the construction and design of the fuselage and tailboom. It affords substantially unobstructed vision to the pilot and observer and, due to the transparency of the fuselage, is practically invisible when viewed at a distance.

The invention is not to be understood as restricted to the details set forth since these may be modified within the scope of the appended claims without departing from the spirit and scope of the invention.

Having thus described the invention what I claim as new and desire to secure by Letters Patent is:

1. An airplane comprising a substantially ellipsoidal fuselage extending fore and aft and having the rear end thereof of pronouncedly dome-shaped contour, and a rigid extremely thin empennage supporting tailboom fixed to, and extending rearwardly from, the apex portion of said rear end of the fuselage.

2. An airplane comprising a substantially ellipsoidal fuselage extending fore and aft and having the rear end thereof of pronouncedly dome-shaped contour, and a separately formed rigid extremely thin empennage supporting tailboom connected to, and extending rearwardly from, the apex portion of said rear end of the fuselage and tapering from the front end thereof to its rear end.

3. An airplane comprising substantially ellipsoidal fuselage extending fore and aft and having the rear end thereof pronouncedly dome-shaped and provided at its apex portion with a circular end ring, and a separately formed extremely thin empennage supporting tailboom of circular cross section connected to, and extending rearwardly from, said end ring.

4. An airplane comprising a substantially ellipsoidal fuselage extending fore and aft and having a sharply curved or dome-shaped rear end, and rigid extremely thin empennage supporting tailboom connected to, and extending rearwardly from, said rear end of the fuselage and disposed for the most part above the longitudinal center of the fuselage.

5. An airplane comprising an elongated fuselage having a sharply curved or dome shaped rear end with an end ring therein above the longitudinal center of the fuselage, and a separately formed rigid extremely thin empennage supporting tailboom of circular cross section connected to, and extending rearwardly from, said end ring.

6. An airplane comprising a substantially ellipsoidal fuselage extending fore and aft and having the rear end thereof of pronouncedly dome-shaped contour and with the apex portion thereof above the longitudinal center of the fuselage and equipped with a circular ring, and a separately formed tubular rigid extremely thin empennage supporting tailboom of circular cross section, connected to, and extending rearwardly from, said ring and disposed for the most part above said longitudinal center of the fuselage.

7. An airplane comprising an elongated fuselage having a dome shaped substantially transparent rear end, and an extremely thin tubular empennage supporting tailboom connected to, and extending rearwardly from, the apex portion of said dome shaped rear end of the fuselage.

8. An airplane comprising a substantially transparent and ellipsoidal fuselage extending fore and aft and having the rear end thereof of sharply curved or pronouncedly dome-shaped contour, and an extremely thin empennage supporting tailboom connected to, and extending rearwardly from, the apex portion of said rear end of the fuselage.

9. An airplane comprising a substantially transparent and ellipsoidal fuselage extending fore and aft and having the rear end thereof pronouncedly dome-shaped and with the apex portion thereof above the longitudinal center of the fuselage, and a rigid tubular extremely thin empennage supporting tailboom connected to, and extending rearwardly from, the apex portion of the rear end of the fuselage and tapering from the front end thereof to its rear end.

10. An airplane comprising a substantially ellipsoidal fuselage extending fore and after, having the rear end thereof of pronouncedly dome shaped contour and embodying a substantially complete exterior shell composed of a geodetic or latticed stamped metal framework, and flexible transparent plates extending across, and serving to close, the spaces in the framework and having the margins thereof connected slidably to said framework so that the plates are free to expand or contract, and a rigid extremely thin empennage supporting tailboom fixed to, and extending rearwardly from, the apex portion of said rear end of the fuselage.

RICHARD W. PALMER.